US012381312B2

(12) United States Patent
Jeong et al.

(10) Patent No.: US 12,381,312 B2
(45) Date of Patent: Aug. 5, 2025

(54) ANTENNA RADOME AND ELECTRONIC DEVICE INCLUDING THE SAME

(71) Applicant: SAMSUNG ELECTRONICS CO., LTD., Suwon-si (KR)

(72) Inventors: Jungi Jeong, Suwon-si (KR); Seungtae Ko, Suwon-si (KR); Jongmin Lee, Suwon-si (KR); Yoongeon Kim, Suwon-si (KR); Bumhee Lee, Suwon-si (KR); Youngju Lee, Suwon-si (KR); Seungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 18/109,476

(22) Filed: Feb. 14, 2023

(65) Prior Publication Data

US 2023/0198138 A1 Jun. 22, 2023

Related U.S. Application Data

(63) Continuation of application No. PCT/KR2022/004747, filed on Apr. 1, 2022.

(30) Foreign Application Priority Data

Apr. 2, 2021 (KR) ........................ 10-2021-0043629

(51) Int. Cl.
*H01Q 1/42* (2006.01)
*H01Q 1/24* (2006.01)
(Continued)

(52) U.S. Cl.
CPC ............... *H01Q 1/42* (2013.01); *H01Q 1/246* (2013.01); *H01Q 9/0407* (2013.01); *H01Q 21/06* (2013.01)

(58) Field of Classification Search
CPC .......... H01Q 1/246; H01Q 1/42; H01Q 1/421; H01Q 1/52; H01Q 1/521; H01Q 1/523;
(Continued)

(56) References Cited

U.S. PATENT DOCUMENTS

| | | | |
|---|---|---|---|
| 5,872,547 | A | 2/1999 | Martek |
| 5,977,710 | A | 11/1999 | Kuramoto et al. |

(Continued)

FOREIGN PATENT DOCUMENTS

| | | |
|---|---|---|
| CN | 201689984 | 12/2010 |
| CN | 102509896 | 6/2012 |

(Continued)

OTHER PUBLICATIONS

International Search Report for PCT/KR2022/004747, mailed Jul. 29, 2022, 5 pages.

(Continued)

*Primary Examiner* — Jason M Crawford
(74) *Attorney, Agent, or Firm* — Nixon & Vanderhye P.C.

(57) ABSTRACT

The disclosure relates to a pre-5$^{th}$-Generation (5G) or 5G communication system to be provided for supporting higher data rates Beyond 4$^{th}$-Generation (4G) communication system such as Long Term Evolution (LTE). According to embodiments of the present disclosure, an electronic device may include: a printed circuit board (PCB); an antenna; a radome; and a coupling structure, the antenna may be disposed to be positioned at a first height from a first surface of the PCB, the coupling structure may be physically connected with the radome, and the coupling structure may be disposed to have a second height lower than or equal to the first height, with respect to the first surface of the PCB.

20 Claims, 22 Drawing Sheets

(51) Int. Cl.
*H01Q 9/04* (2006.01)
*H01Q 21/06* (2006.01)

(58) Field of Classification Search
CPC .. H01Q 21/0006; H01Q 21/06; H01Q 21/065; H01Q 21/28; H01Q 5/30; H01Q 5/307
See application file for complete search history.

(56) References Cited

U.S. PATENT DOCUMENTS

| | | | | |
|---|---|---|---|---|
| 7,460,054 | B2 | 12/2008 | Kim et al. | |
| 10,680,318 | B2 | 6/2020 | Nagata et al. | |
| 2013/0044035 | A1* | 2/2013 | Zhuang | H01Q 9/0428 343/770 |
| 2013/0141291 | A1 | 6/2013 | Luan | |
| 2014/0118196 | A1* | 5/2014 | Koskiniemi | H01Q 21/205 343/702 |
| 2015/0207217 | A1 | 7/2015 | Fujita | |
| 2016/0270052 | A1* | 9/2016 | Dame | H01Q 1/521 |
| 2017/0307724 | A1* | 10/2017 | Park | G01S 7/032 |
| 2018/0233812 | A1* | 8/2018 | Kim | G01S 7/35 |
| 2018/0321357 | A1* | 11/2018 | Kim | H01Q 1/42 |
| 2020/0295433 | A1* | 9/2020 | Kim | H01Q 1/38 |
| 2021/0036415 | A1* | 2/2021 | Jia | H01Q 15/0026 |
| 2021/0036432 | A1 | 2/2021 | Kim et al. | |
| 2021/0098863 | A1* | 4/2021 | Baek | H01Q 1/38 |
| 2022/0085518 | A1* | 3/2022 | Thomas | H01Q 21/24 |
| 2023/0009333 | A1* | 1/2023 | Yun | H04B 7/0413 |
| 2023/0092210 | A1* | 3/2023 | Yang | H01Q 1/36 343/702 |
| 2023/0178885 | A1* | 6/2023 | Kim | H01Q 1/32 343/700 R |
| 2023/0198138 | A1* | 6/2023 | Jeong | H01Q 1/421 343/702 |
| 2023/0291115 | A1* | 9/2023 | Hollaender | H01Q 13/106 |
| 2023/0291117 | A1* | 9/2023 | Kim | H01Q 1/521 |
| 2023/0299491 | A1* | 9/2023 | Harel | H01Q 13/18 343/702 |
| 2025/0015500 | A1* | 1/2025 | Yamada | H01Q 1/48 |
| 2025/0015506 | A1* | 1/2025 | Yoon | H01Q 5/392 |
| 2025/0038426 | A1* | 1/2025 | Lee | H01Q 21/065 |

FOREIGN PATENT DOCUMENTS

| | | |
|---|---|---|
| CN | 204230434 | 3/2015 |
| JP | 05-003409 | 1/1993 |
| JP | 2003-224414 | 8/2003 |
| JP | 2003-273639 | 9/2003 |
| JP | 2004-200895 | 7/2004 |
| JP | 2010-109890 | 5/2010 |
| JP | 2019-186920 | 10/2019 |
| KR | 10-0607648 | 8/2006 |
| KR | 10-0945550 | 3/2010 |
| KR | 10-2013-0052176 | 5/2013 |
| KR | 10-1517475 | 5/2015 |
| KR | 10-2030696 | 10/2019 |
| KR | 10-2021-0014326 | 2/2021 |
| WO | 2007/084051 | 7/2007 |
| WO | 2020/234590 | 11/2020 |

OTHER PUBLICATIONS

Written Opinion of the ISA for PCT/KR2022/004747, mailed Jul. 29, 2022, 4 pages.

Extended European Search Report dated May 21, 2024 issued in European Patent Application No. 22781711.1.

Korean Office Action dated May 19, 2025 for KR Application No. 10-2021-0043629.

* cited by examiner dB (S(1,1))

ANTENNA RADOME AND ELECTRONIC DEVICE INCLUDING THE SAME

CROSS-REFERENCE TO RELATED APPLICATIONS

This application is a continuation of International Application No. PCT/KR2022/004747 designating the United States, filed on Apr. 1, 2022, in the Korean Intellectual Property Receiving Office and claiming priority to Korean Patent Application No. 10-2021-0043629, filed on Apr. 2, 2021, in the Korean Intellectual Property Office, the disclosures of which are incorporated by reference herein in their entireties.

BACKGROUND

Field

The disclosure relates to a wireless communication system, and for example, to an antenna radome for the wireless communication system and an electronic device including the same.

Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A product equipped with a plurality of antennas is being developed to improve communication performance, and it is expected that equipment having far more antennas will be used by utilizing massive multiple input multiple output (MIMO) technology. To accommodate a great number of antennas, it is required to minimize communication equipment. For the miniaturization, a distance between a radome and the antenna reduces, and accordingly antenna performance sensitivity increases due to a tolerance according to radome deployment.

SUMMARY

Embodiments of the disclosure provide an antenna radome including a coupling structure and an electronic device including the same.

Embodiments of the disclosure provide an antenna radome for preventing and/or reducing antenna performance deterioration and an electronic device including the same, through an additional structure in a wireless communication system.

Embodiments of the disclosure provide an antenna radome for compensating for a radome tolerance and an electronic device including the same, through a coupling structure disposed at a lower height than an antenna radiator, in a wireless communication system.

According to example embodiments of the present disclosure, an electronic device may include: a printed circuit board (PCB); an antenna; a radome; and a coupling structure, the antenna may be disposed to be positioned at a first height from a first surface of the PCB, the coupling structure may be physically connected with the radome, and the coupling structure may be disposed to have a second height lower than or equal to the first height, from the first surface of the PCB.

According to example embodiments of the present disclosure, an electronic device may include: a printed circuit board (PCB); a plurality of antennas; a radome; and a plurality of coupling structure sets, the plurality of the coupling structure sets may be physically connected with the radome, and each set of the plurality of the coupling structure sets may be disposed to have a height lower than or equal to a height of a corresponding antenna among the plurality of the antennas, from a first surface of the PCB.

An apparatus and a method according to various example embodiments of the present disclosure, may reduce antenna performance deterioration due to an antenna radome tolerance, through a coupling structure connected to the antenna radome.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
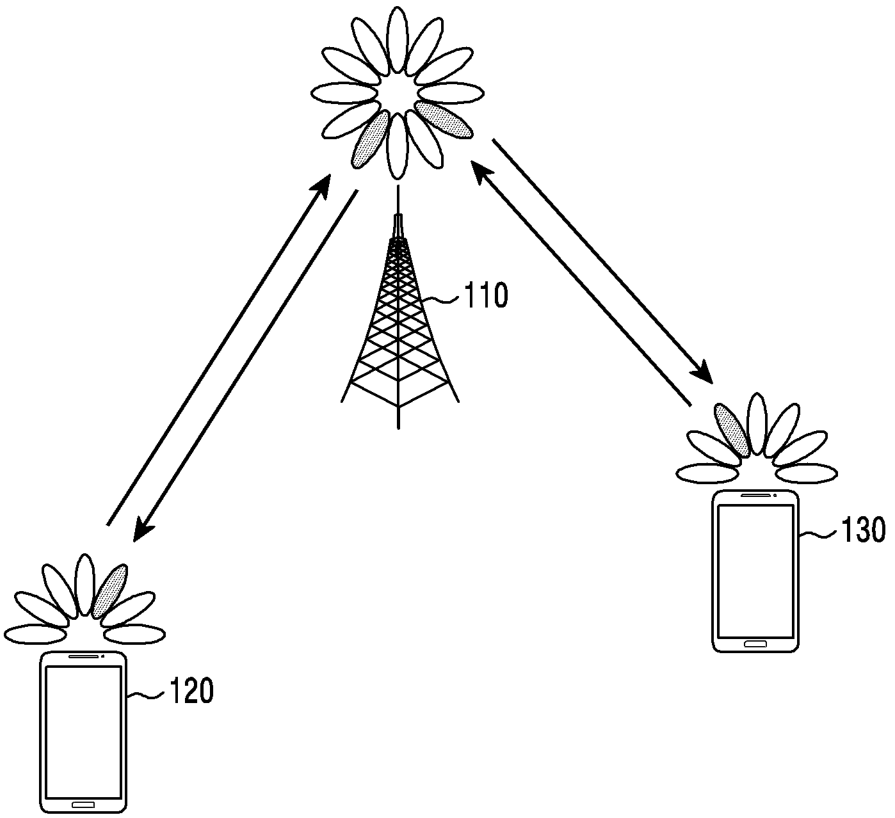
FIG. 1 is a diagram illustrating an example wireless communication system according to embodiments.

Terms used in the present disclosure are used for describing various example embodiments, and are not intended to limit the scope of the disclosure. A singular expression may include a plural expression, unless they are definitely different in a context. All terms used herein, including technical and scientific terms, may have the same meaning as those commonly understood by a person skilled in the art of the present disclosure. Terms defined in a generally used dictionary among the terms used in the present disclosure may be interpreted to have the meanings that are the same as or similar to the contextual meanings in the relevant field of art, and are not to be interpreted to have ideal or excessively formal meanings unless clearly defined in the present disclosure. In some cases, even where a term is defined in the disclosure it should not be interpreted to exclude embodiments of the present disclosure.

Various embodiments of the present disclosure to be described below explain a hardware approach by way of example. However, since the various embodiments of the present disclosure include a technology using both hardware and software, various embodiments of the present disclosure do not exclude a software-based approach.

Hereafter, the present disclosure relates to an antenna radome and an electronic device including the same in a wireless communication system. For example, the present disclosure discloses a technique for compensating for performance degradation due to a radome tolerance, by connecting a coupling structure to the antenna radome mounted to structurally protect an antenna in the wireless communication system.

A tolerance described in the present disclosure may refer, for example, to an allowable limit of a standard range. The standard range may be determined according to an allowable range defined based on a nominal size, for example, the tolerance. An accumulated tolerance or a tolerance accumulation may refer, for example, to an allowable limit of an assembly according to accumulation of an allowable limit of a single part, if a plurality of parts is assembled. A processing tolerance may refer, for example, to a tolerance defined according to part processing.

Terms referring to parts of an electronic device (e.g., a substrate, a plate, a layer, a printed circuit board (PCB), a flexible PCB (FPCB), a module, an antenna, an antenna element, a circuit, a processor, a chip, a component, a device), terms referring to functions or shapes of an element (e.g., a coupling structure, a tuning structure, a structure, a support portion, a contact portion, a protrusion portion, an opening portion, a radiator, a tuning radiator), terms referring to connection units between structures (e.g., a connection portion, a contact portion, a support portion, a tuning structure, a tuning connection portion, a contact structure, a conductive member, an assembly), and terms referring to circuits (e.g., a transmission line, a PCB, an FPCB, a signal line, a feeding line, a data line, a radio frequency (RF) signal line, an antenna line, an RF path, an RF module, an RF circuit) used in the following disclosure may be used by way of example for convenience of description. Accordingly, the present disclosure is not limited to terms to be described, and other terms having equivalent technical meanings may be used. In addition, terms such as '. . . unit', '. . . er' '. . . structure', and '. . . body' used herein may indicate at least one shape structure or a unit for processing a function.

In addition, the present disclosure describes various example embodiments using terms used in some communication standard (e.g., long term evolution (LTE), new radio (NR) defined in 3rd generation partnership project (3GPP)), which are merely examples for ease of explanation. Various embodiments of the present disclosure may be easily modified and applied in other communication system.

In the present disclosure, to determine whether a specific condition is satisfied or fulfilled, expressions such as greater than or less than are used by way of example and do not exclude expressions such as greater than or equal to or less than or equal to. A condition described with 'greater than or equal to' may be replaced by 'greater than', a condition described with 'less than or equal to' may be replaced by 'less than', and a condition described with 'greater than or equal to and less than' may be replaced by 'greater than and less than or equal to'.

The present disclosure relates to an antenna radome and an electronic device including the same in a wireless communication system. For example, the present disclosure discloses a technique for reducing antenna performance degradation according to a position change of the antenna radome, by deploying a coupling structure to the antenna radome.

FIG. 1 is a diagram illustrating an example wireless communication system according to embodiments. A wireless communication environment 100 of FIG. 1 illustrates a base station 110 and a terminal 120, as some of nodes which use a radio channel.

Referring to FIG. 1, the base station 110 is a network infrastructure for providing radio access to the terminal 120. The base station 110 has coverage defined as a specific geographical area based on a signal transmission distance. The base station 110 may be referred to as, besides the base station, a massive multiple input multiple output (MIMO) unit, an 'access point (AP)', an 'eNodeB (eNB)', a '5th generation node (5G node)', a '5G Node B (NB)', a 'wireless point', a 'transmission/reception point (TRP)', an 'access unit', a 'distributed unit (DU)', a 'TRP', a 'radio unit (RU)', a 'remote radio head (RRH)' or other term having technically identical meaning. The base station 110 may transmit a downlink signal or receive an uplink signal.

The terminal 120 is a device used by a user, and communicates with the base station 110 over a radio channel. In some cases, the terminal 120 may be operated without user's involvement. For example, the terminal 120 is a device for performing machine type communication (MTC), and may not be carried by the user. The terminal 120 may be referred to as, besides the terminal, a 'user equipment (UE)', a 'mobile station', a 'subscriber station', a 'customer premises equipment (CPE)', a 'remote terminal', a 'wireless terminal', an 'electronic device', or a 'vehicle terminal', a 'user device', or other terms having technically identical meaning.

The terminal 120 and the terminal 130 shown in FIG. 1 may support vehicle communication. In the vehicle communication, standardization for vehicle to everything (V2X) technology based on a device-to-device (D2D) communication structure in the LTE system has been completed in 3GPP release 14 and release 15, and efforts are underway to develop the V2X technology based on the current 5G NR. NR V2X supports unicast communication, groupcast (or multicast) communication, and broadcast communication between a terminal and a terminal.

A major technique for improving 5G communication data capacity is a beamforming technology using an antenna array connected to a plurality of RF paths. The beamforming technology is used, as one of techniques for mitigating a propagation pass loss and increasing a propagation distance. The beamforming generally concentrates propagation coverage using the multiple antennas, or increases receive sensitivity directivity for a specific direction. Hence, communication equipment may include a plurality of antennas, to build the beamforming coverage instead of forming a signal in an isotropic pattern using a single antenna. Hereafter, the antenna array including the multiple antennas is described.

The base station 110 or the terminal 120 may include an antenna array. The antenna array may be configured in various types such as a two-dimensional planar array, a linear array or a multi-layer array. The antenna array may be referred to as a massive antenna array. Each antenna included in the antenna array may be referred to as an array element, or an antenna element. Hereafter, the antenna element of the antenna array is illustrated with a rectangular patch antenna as an example in the present disclosure, which is merely an embodiment, and does not limit other embodiments of the present disclosure.

Figure 2A:
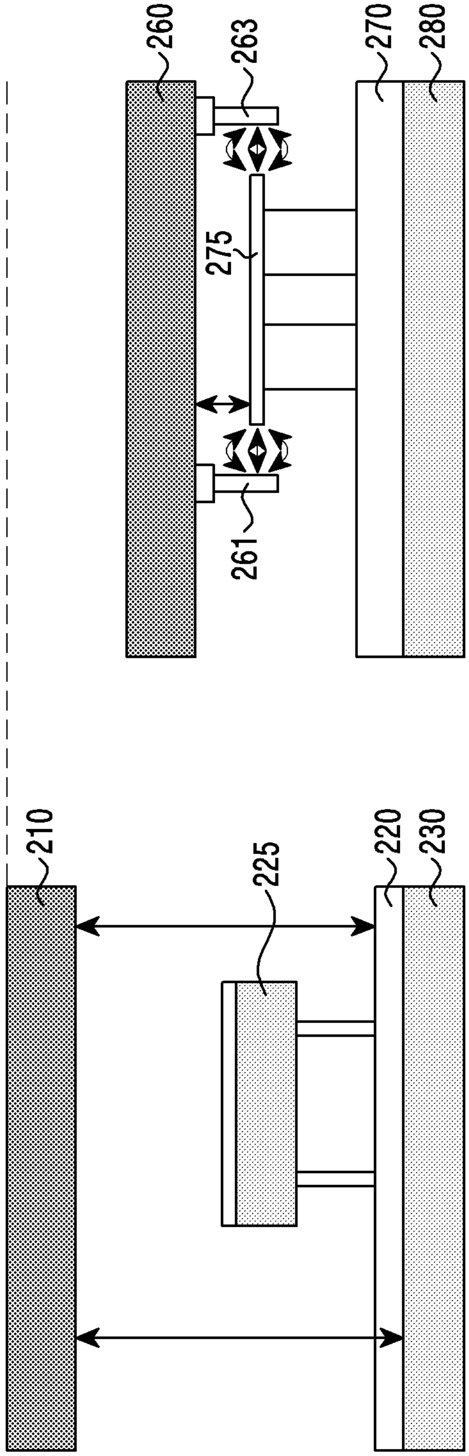
FIG. 2A and FIG. 2B are diagrams illustrating examples of an antenna according to embodiments.
Figure 2B:
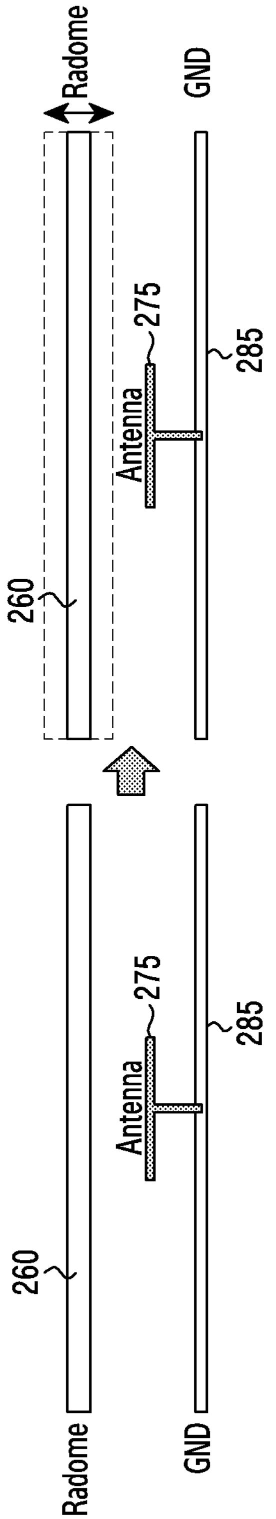

FIG. 2A and FIG. 2B are diagrams illustrating examples of an antenna according to embodiments. A radome may refer to a structure for structurally protecting the antenna. The radome attenuates electromagnetic signals transmitted or received by the antenna to minimum, and may be formed with a radio wave permeable material. Hereafter, the antenna may refer to the antenna element of the array antenna in the present disclosure.

Referring to FIG. 2A, an antenna board 220 may be disposed on a metal plate 230. An antenna 225 may be mounted on the antenna board 220. For example, the antenna may be coupling fed through a support portion or may be fed directly through the support portion. Meanwhile, a radome 210 may be disposed at a position spaced apart the antenna board 220 over a specific interval. If the separation distance of the radome 210 and the antenna board 220 is considerable, antenna performance sensitivity by the radome 210 is low. This is because the distance between the radome 210 and the antenna 225 is large and a height change of the radome 210 affects the antenna 225 little.

The number of the antennas of the wireless communication equipment (e.g., the base station 110) is increasing to improve the communication performance. In addition, the number of RF parts (e.g., an amplifier, a filter) for processing RF signals transmitted and received via the antenna element, and components increase, and spatial gain and cost efficiency are essential while satisfying the communication performance in the communication equipment configuration. For example, an ultra thin antenna may be used to, minimize and/or reduce the communication equipment.

If a spacing between a radome 260 and an antenna board 270 is reduced, influence of the radome 260 on an antenna 275 increases. This is because the distance between the radome 260 and the antenna board 270 is short, and a height change of the radome 260 considerably effects the antenna 275. To reduce such influence, an additional structure 261 and 263 may be disposed in the radome. The additional structure 261 and 263 may include an element adopting a tunable element technology. The additional structure 261 and 263 (e.g., a ring) may be coupled with a radiator, and thus performance variation by the radome may be compensated.

Referring to FIG. 2B, a random tolerance may cause distance variation between the antenna 275 and the radome 260. The radome may be disposed on an antenna front portion of the communication equipment (e.g., a base station). Based on the antenna board (e.g., a ground (GND) layer 285), the radome is spaced from the antenna. At this time, the radome has the tolerance, and the distance between the antenna board 270 and the radome 260 changes. The distance change between the antenna board 270 and the radome 260 affects the antenna performance. In other words, the performance variation of the antenna 275 by the height tolerance of the radome 260 is inevitable. For example, since the shorter distance between the antenna 275 and the radome 260 affects antenna characteristics more, a radome design robust to the height tolerance of the radome 260 is required.

Figure 3:
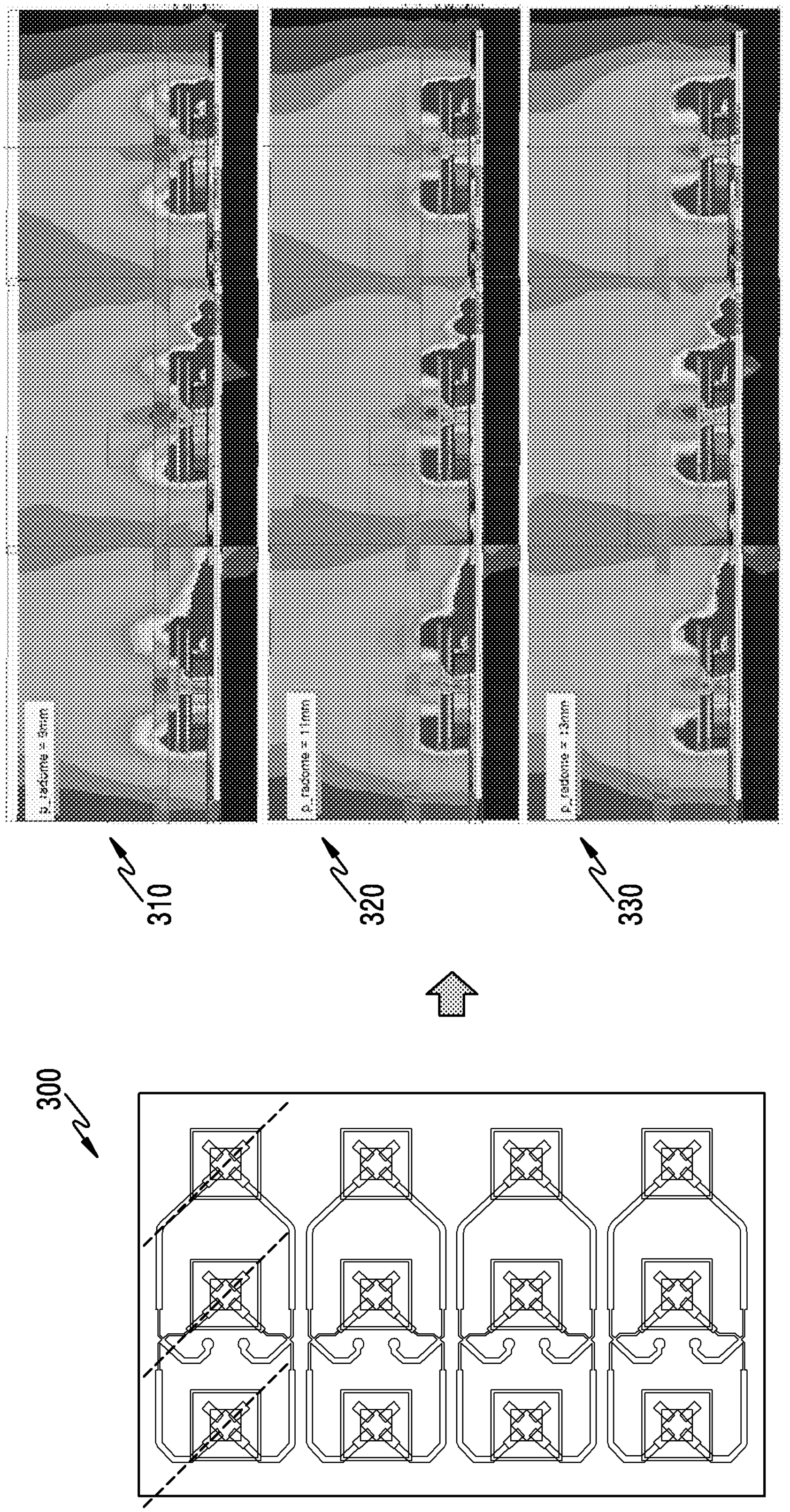
FIG. 3 is a diagram illustrating an example of an electric field according to embodiments.

FIG. 3 is a diagram illustrating an example of an electric field according to embodiments. An antenna array including 3×1 subarrays is described by way of example in FIG. 3, but is merely an example for explaining the radome tolerance in various example embodiments of the present disclosure, and does not limit the antenna array or the antenna deployment to which the embodiments of the present disclosure are applied.

Referring to FIG. 3, an antenna unit 300 may include, for example, 12 antennas. The antenna unit may include four subarrays. For example, each subarray may include antenna elements arranged in 3×1 form. Each antenna element of the antenna unit 300 is a rectangular patch type, and a dual polarization signal may be fed.

A graph 310 shows electric field distribution, if the radome height from the antenna board is 9 mm A graph 320 shows electric field distribution, if the radome height from the antenna board is 11 mm A graph 330 shows electric field distribution, if the radome height from the antenna board is 13 mm. It is identified that a fringing field area varies, according to the height of the radome. For example, an antenna permittivity changes, according to the radome height. The antenna permittivity affects a resonant frequency. For example, the resonant frequency rises if the radome height increases. As another example, if the radome height decrease, an effective permittivity of the antenna may increase due to the radome permittivity. The resonant frequency may be lowered due to the increase of the effective permittivity. The lower radome height considerably affects the antenna performance.

Figure 4A:
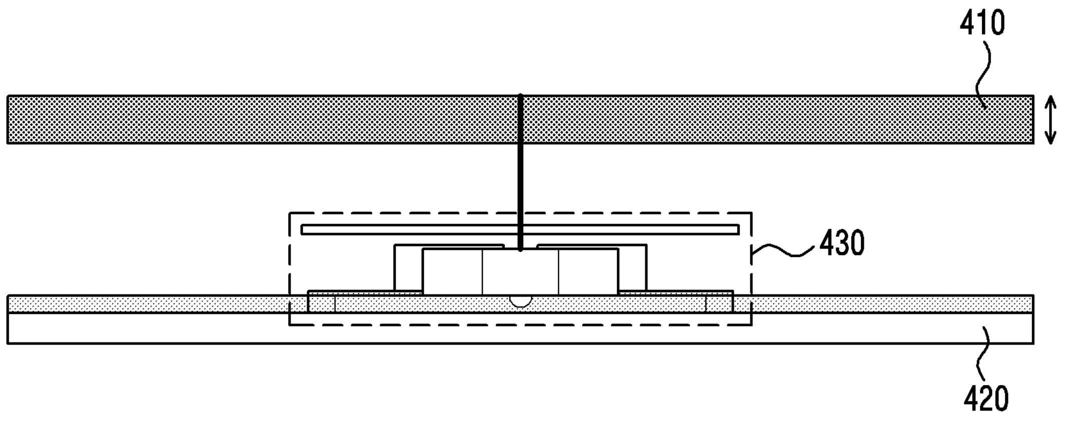
FIG. 4A is a diagram illustrating an example of a radome tolerance according to embodiments.

FIG. 4A is a diagram illustrating an example radome tolerance according to embodiments. Hereafter, a reference surface indicating the height indicates the ground layer of the antenna board unless otherwise explained. For example, the antenna height indicates a height of one surface of a patch antenna disposed substantially in parallel from the ground layer (hereafter, the reference surface).

Referring to FIG. 4A, the electronic device may include a cover for protecting the antenna, for example, a radome 410. An antenna 430 may be disposed at a first height, based on an antenna board 420. The radome 410 may be disposed at a second height, based on the antenna board 420. The radome 410 may be disposed at a specific height over the antenna, to structurally protect the antenna 430. In other words, the second height may be higher (e.g., greater) than the first height.

The radome 410 may be manufactured separately from the antenna 430, and accordingly a manufacturing tolerance may occur. In addition, after antenna assembly, the radome 410 may be assembled to cover the assembled antenna module, and a tolerance may occur in the assembly. The height of the radome 410 may change due to the tolerance of the radome 410. If a distance between the radome 410 and the antenna 430 is greater than or equal to a specific value, the height of the radome 410 changes but does not affect radiation performance of the antenna 430. However, like the ultra thin antenna, if the distance between the radome 410 and the antenna 430 is less than the specific value, the tolerance of the radome 410 affects the radiation performance of the antenna 430. In addition, the shorter distance between two may considerably affect the electric field of the antenna 430.

The radome 410 and the antenna 430 of the short distance may be understood as operating as one antenna, when viewed from outside. For example, the low height of the radome 410 may indicate that the radome 410 functions as a dielectric. As the height of the radome 410 lowers, the effective permittivity of the antenna 430 increases. As the permittivity increases, an operating frequency which forms resonance in the antenna lowers. As the height of the radome 410 increases, the effective permittivity of the antenna 430 reduces. As the permittivity reduces, the operating frequency which forms the resonance in the antenna increases. In other words, the height of the radome 410 may be proportional to the operating frequency.

Figure 4B:
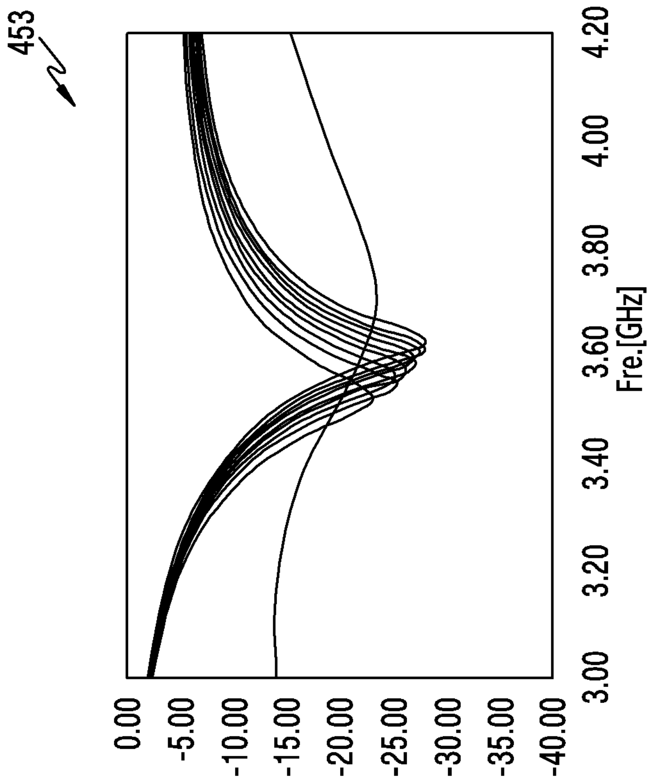
FIG. 4B illustrates examples of antenna performance based on a radome tolerance according to embodiments.
Figure 4B:
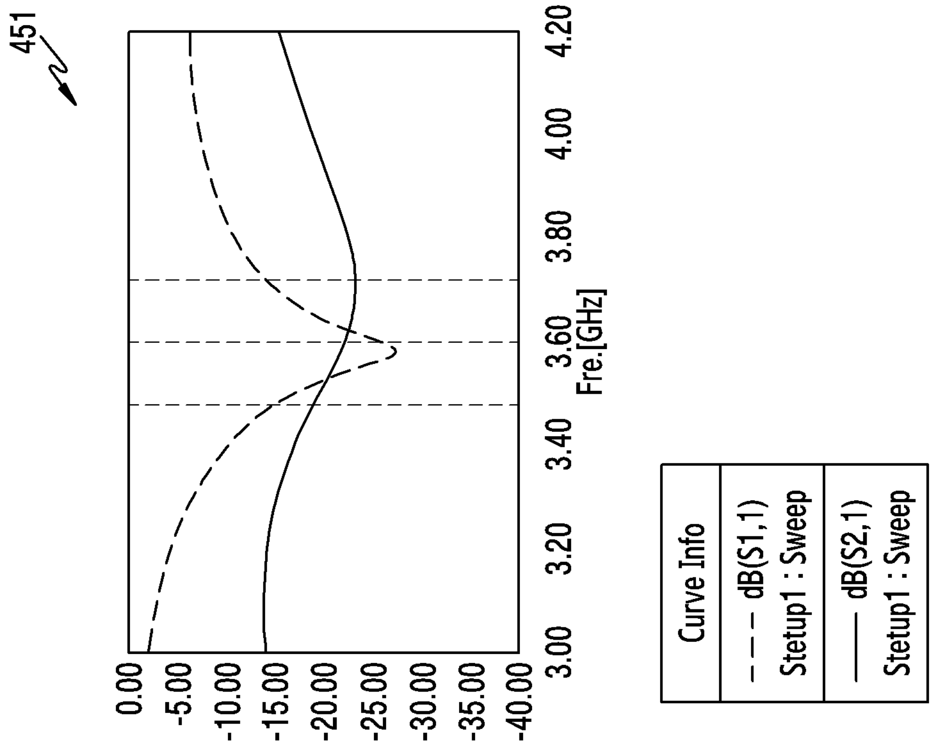

Referring to FIG. 4B, a graph 451 shows antenna reflection characteristics at a fixed radome height. The horizontal axis indicates the frequency (unit: GHz), and the vertical axis indicates S-parameters (unit: decibel (dB)). S(2,1) indicates a transmission coefficient, and S(1,1) indicates a reflection coefficient. A graph 453 shows antenna reflection characteristics having the radome tolerance (e.g., ±2 mm). The horizontal axis indicates the frequency (unit: GHz), and the vertical axis indicates the S-parameters (unit: dB). Comparing the graph 451 and the graph 453, unstable reflection characteristics based on the radome height are identified. Improvement is demanded, to maintain the reflection characteristics based on the radome height. Hereafter, a coupling structure physically connected to the radome is suggested, to maintain the reflection characteristics even if the radome height changes, in FIG. 5A through FIG. 7H.

Figure 5A:
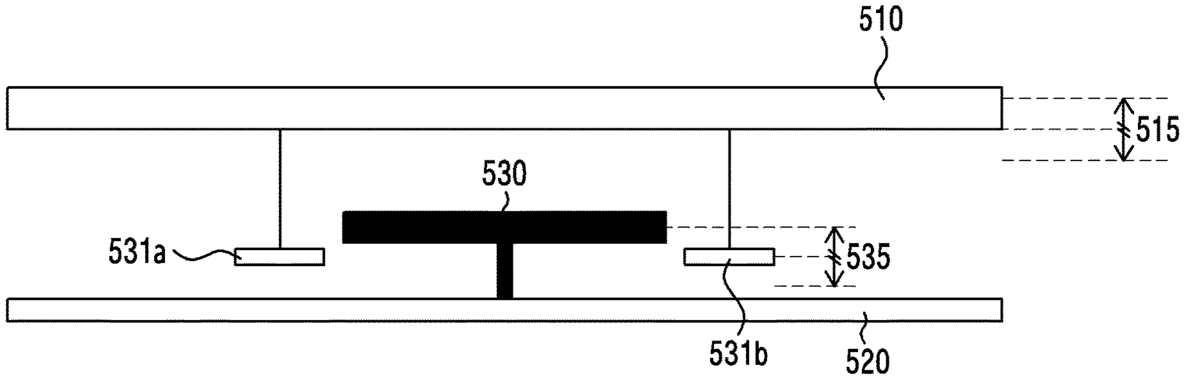
FIG. 5A and FIG. 5B are diagrams illustrating an example deployment principle of a coupling structure according to embodiments.
Figure 5B:
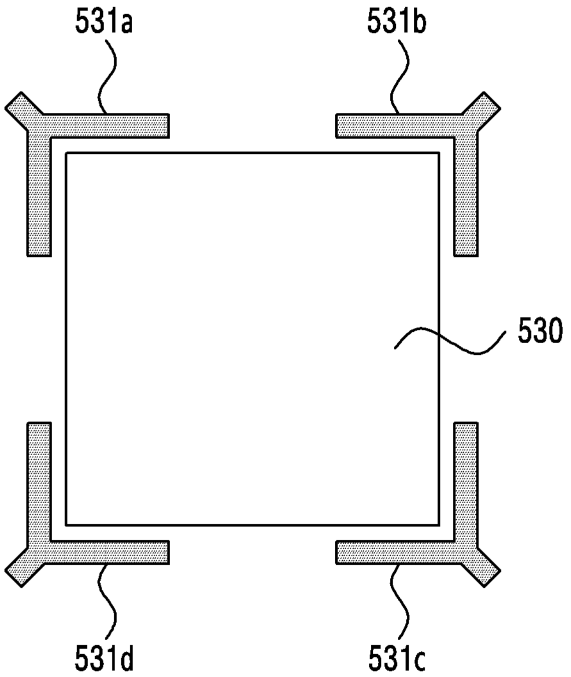

FIG. 5A and FIG. 5B are diagrams illustrating an example deployment principle of a coupling structure according to embodiments. The coupling structure may refer to a structure for controlling the electric field of the antenna through the coupling connection with the antenna. The term 'coupling structure' may refer, for example, to a structure connected to the radome and having a function for controlling the electric field of the antenna. Other terms which fulfill the same or similar function may be used instead of the term 'coupling structure' for embodiments of the present disclosure. For example, the coupling structure may be replaced with other name such as an adaptive tuner, a tuning structure, a coupling tuner, an adaptive tuning radiator, a tuning radiator, a protrusion radiator, or a protrusion, etc. Hereafter, the reference surface indicating the height may indicate the height based on the ground layer of the antenna board unless otherwise explained. In addition, the height of the antenna indicates the height of one surface of the antenna disposed substantially in parallel from the ground layer (hereafter, the reference surface).

Referring to FIG. 5A, a height of a radome 510 may change due to a tolerance 515 of the radome 510. If the height of the radome 510 increases, a distance between the radome 510 and an antenna 530 increases. The increased distance lowers the effective permittivity, and increases the operating frequency. Conversely, if the height of the radome 510 decreases, the distance between the radome 510 and the antenna 530 decreases. The decreased distance increases the effective permittivity, and lowers the operating frequency. In response to the height change of the radome 510, to provide constant antenna 530 performance, a structure for compensating for the operating frequency which varies according to the height of the radome 510 is required.

Coupling structures 531*a* and 531*b* according to embodiments of the present disclosure may be disposed to be farther away from the antenna 530, if the height of the radome 510 decreases. Hereafter, descriptions of the coupling structures 531*a* and 531*b* are explained based on the coupling structure 531*a*, but the other coupling structure 531*b* may be applied in the same manner. In addition, the radome deployment structure shown in FIG. 5A is merely an example of one cross section, and accordingly the number of the coupling structures may be one or two or more. As the coupling structure 531*a* is farther away from the antenna 530, the operating frequency by the coupling structure 531*a* may increase. The coupling structure 531*a* according to embodiments of the present disclosure may be disposed to be closer to the antenna 530, if the height of the radome 510 increases. As the coupling structure 531*a* is closer to the antenna 530, the operating frequency by the coupling structure 531*a* may decrease. As the radome 510 is closer to the antenna 530, the coupling structure 531*a* may be farther way from the antenna 530. As the radome 510 is farther way from the antenna 530, the coupling structure 531*a* may be closer to the antenna 530. To operate in the opposite manner to the height change according to the tolerance 515 of the radome 510, the coupling structure 531*a* according to embodiments of the present disclosure may be physically connected with the radome 510.

The coupling structure 531*a* according to embodiments of the present disclosure may be positioned farther than the antenna 530 from the radome 510. Based on the antenna board (e.g., a ground layer 520), the coupling structure 531*a* may be positioned at the same or lower height than the antenna 530 based on the antenna board (e.g., the ground layer 520). According to an embodiment, the radome 510 and the coupling structure 531*a* may be physically connected. The physical connection may include not only a structure where the separate coupling structure 531*a* and the radome 510 contact through a physical connection portion but also a structure where some material of the radome 510 is protruded to be positioned below the height of the antenna 530. According to the radome tolerance 515, the height of the coupling structure 531*a* also has a tolerance 535. As the radome 510 and the coupling structure 531*a* are physically connected, a height variation range 515 of the radome 510 may correspond to a height variation range 535 of the coupling structure 531*a*.

According to an embodiment, the coupling structure 531*a* may be positioned at the lower or identical height than the antenna 530. This is because the coupling structure 531*a* needs to be positioned below the antenna 530 in height, to be closer to the antenna 530, if the height of the radome 510 increases. The coupling structure 531*a* may change in height according to the tolerance 515 of the radome 510. According to an embodiment, an upper limit of the height variation of the coupling structure 531*a* may be the antenna 530 height. That is, the height of the coupling structure 531*a* may be disposed to be substantially parallel to the surface of the antenna 530. Meanwhile, according to an embodiment, the upper limit of the height variation of the coupling structure 531*a* may be lower than the antenna 530 height. A specific height difference may be maintained, not to change the radiation performance through the contact between the coupling structure 531*a* and the antenna 530.

According to an embodiment, if the radome tolerance 515 is the highest (e.g., if the radome 510 is farthest from the ground layer 520), the coupling structure 531*a* may be closest to the antenna 530. As the coupling structure 531*a* is closer to the antenna 530, an electric current coupled to the coupling structure 531*a* may increase. The coupling current increase provides an effect of substantially increasing a radiation area of the antenna 530. The operating frequency of the antenna 530 may be lowered. The operating frequency to be increased due to the height of the radome 510 may be compensated by the coupling structure 531*a*. The operating frequency may be maintained.

According to an embodiment, if the radome tolerance 515 is lowest (e.g., if the radome 510 is closest from the ground layer 520), the coupling structure 531*a* may be farthest from the antenna 530. As the coupling structure 531*a* is farther from the antenna 530, the electric current coupled to the coupling structure 531*a* reduces. Since the coupling current reduction reduces the expansion effect of the antenna 530 radiation area, the operating frequency of the antenna 530 may be higher than the coupling structure 531 closer to the antenna 530. The operating frequency to be decreased due to the height of the radome 510 may be compensated by the coupling structure 531*a*. The operating frequency may be maintained. Hereafter, the coupling structure 531*a* is exemplified in FIG. 5B.

Referring to FIG. 5B, according to an embodiment, coupling structures 531*a*, 531*b*, 531*c*, and 531*d* may be disposed in a structure surrounding the antenna 530, when viewed from above. For example, the antenna 530 may include a rectangular patch antenna 530. The coupling structures 531*a*, 531*b*, 531*c*, and 531*d* each may be configured to couple the current from the antenna 530. The coupling structures 531*a*, 531*b*, 531*c*, and 531*d* each may include a conductive path to make the couple current flow. According to an embodiment, the upper limit of the height variation of each coupling structure may be the antenna 530 height. According to another embodiment, the upper limit of the height variation of the coupling structure may be lower in position than the antenna 530 height.

While the coupling structures 531*a*, 531*b*, 531*c*, and 531*d* surrounding the rectangular patch antenna 530 are illustrated in FIG. 5B, the embodiments of the present disclosure are not limited thereto. The embodiments of the present disclosure may be applied to other antenna 530 elements than the rectangular patch. According to an embodiment, coupling structures may be disposed in adjacent areas of an octagonal patch antenna 530 for increasing a co-pol component in dual polarization. (e.g., FIG. 7H). In addition, according to another embodiment, one or more coupling structures may be disposed in adjacent areas of a circular patch antenna 530.

Figure 6:
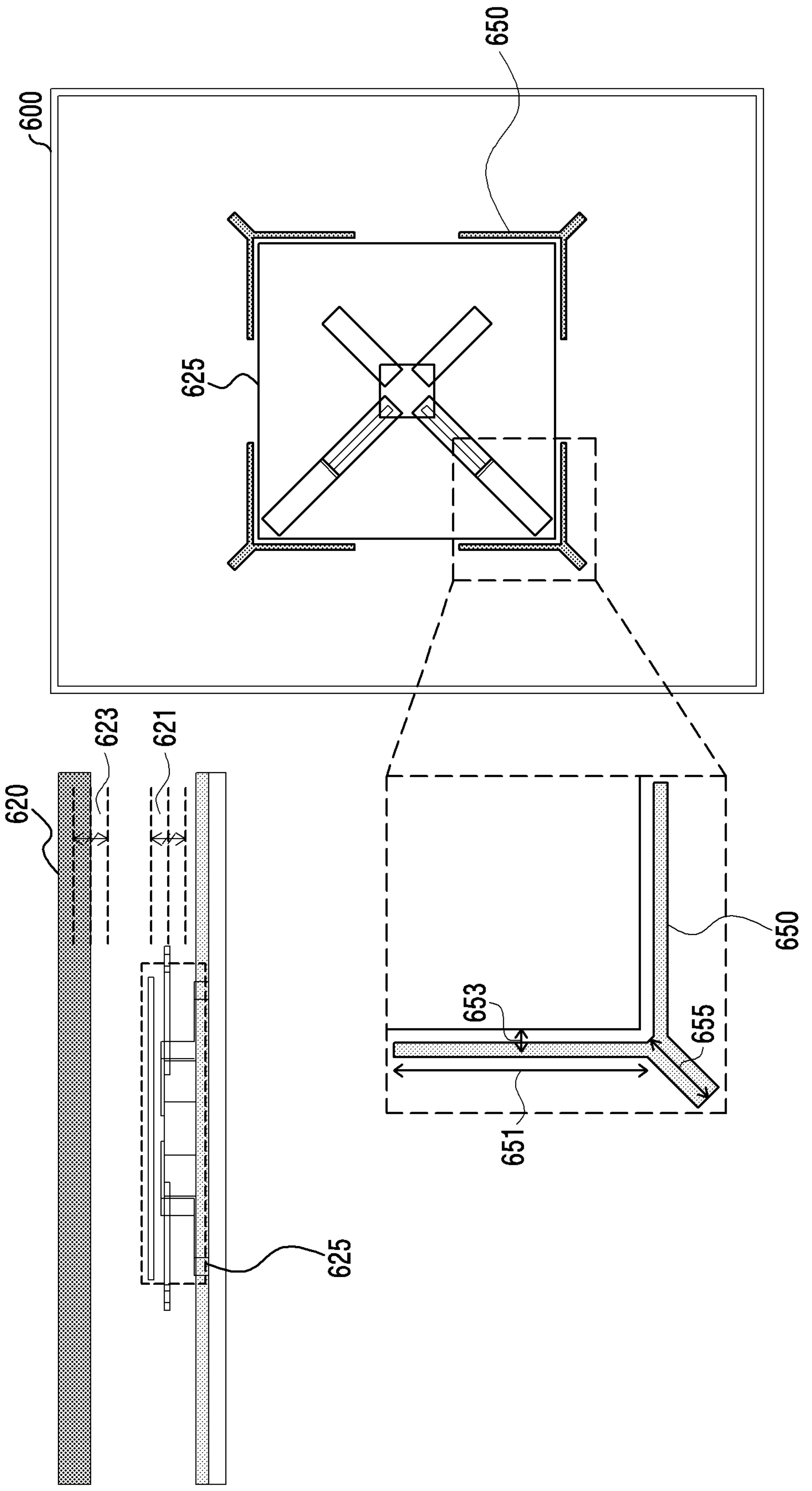
FIG. 6 is a diagram illustrating an example design principle of a coupling structure according to embodiments.

FIG. 6 is a diagram illustrating an example design principle of a coupling structure according to embodiments.

Referring to FIG. 6, a plan view 600 is a view taken from above an electronic device including a radome 620 and an antenna 625. Due to a tolerance 623 of the radome 620, a height of a coupling structure 650 may be positioned within a range 621.

According to an embodiment, the coupling structure 650 may be positioned at the lower or same height than or as the antenna 625. In other words, the height range 621 of the coupling structure 650 may be below the antenna 625 height. According to an embodiment, based on the plan view 600, the coupling structure 650 may be symmetrically disposed based on the antenna 250. According to an embodiment, based on the plan view 600, one or more coupling structures 650 each may be disposed at a position surrounding the antenna 625. For example, four coupling structures may be disposed at corner areas of a rectangular patch.

The shape of the coupling structure 650 may be configured in various manners. Various parameters are defined, to define the shape and the position of the coupling structure 650 in the present disclosure. According to an embodiment, a distance 653 between the coupling structure 650 and the antenna 625 is defined. The distance between the coupling structure 650 and the antenna 625 reduces, a coupling amount of the coupling structure 650 increases. According to an embodiment, a length 651 of the coupling structure 650 is defined. As the length of the coupling structure increases, the coupling amount increases. According to an embodiment, a thickness 655 of the coupling structure 650 may be defined. As the thickness 655 increases, a size of a coupling area increases. The position and the shape of the coupling structure 650 may be configured, by adjusting each parameter of the coupling structure 650, to achieve the same magnitudes of a characteristic variation according to the height change of the radome 620 and a characteristic variation according to the height change of the coupling structure 650.

According to an embodiment, the coupling structure 650 may have a shape determined based on the coupling magnitude. A required coupling magnitude may depend on at least one of the tolerance 623 of the radome 620, the range 625 of the coupling structure 650, and the distance between the radome 620 and the antenna 625. This is because the coupling opposing the effect of the radome 620 is required, to compensate for the tolerance 623 of the radome 620. According to an embodiment, the length 651 of the coupling structure 650 and the thickness 655 of the coupling structure 650 may be defined, depending on the required coupling magnitude. The shape of the coupling structure 650 depends on the length 651 of the coupling structure 650 and the thickness 655 of the coupling structure 650.

According to an embodiment, the coupling structure 650 may be disposed at a position determined based on the coupling magnitude. The required coupling magnitude may depend on at least one of the tolerance 623 of the radome 620, the range 625 of the coupling structure 650, and the distance between the radome 620 and the antenna 625. Even though the shape of the coupling structure 650 is fixed, the coupling magnitude may be adjusted, by controlling the spacing between the coupling structure 650 and the antenna 625. According to an embodiment, the position of the coupling structure 650 may be defined, depending on the required coupling magnitude. The position of the coupling structure 650 depends on the distance 653 between the coupling structure 650 and the antenna 625.

While the triangular start lengthened in three directions (e.g., (+) x-axis direction, (+) y-axis direction, (−) x-axis 45-degree and (−) y-axis 45-degree directions) has been described as the example of the coupling structure shape in FIG. 6, the embodiments of the present disclosure are not limited thereto. Examples of various shapes of the coupling structure are described in greater detail below with reference to FIGS. 6A, 7B, 7C, 7D, 7E, 7F, 7G and 7H (which may be referred to as FIG. 7A through FIG. 7H).

FIG. 7A through FIG. 7H are diagrams illustrating examples of various coupling structures according to embodiments. The coupling structure may have various shapes. Any shape, which increases the substantial radiation area, through the coupling with the antenna, may function as the coupling structure of the present disclosure. According to an embodiment, the coupling structure may be a conductor. According to an embodiment, the coupling structure may be a dielectric. It may be designed to achieve the same effect through dielectric coupling. According to an embodiment, the coupling structure may be coupled from the antenna, thus increase the radiation area of the antenna. According to an embodiment, the coupling structure may have a structure for adjusting the length of the coupled current. Hereafter, the shapes described in FIG. 7A through FIG. 7H are simply example structures corresponding to the above-described structure, and are not intended to limit the scope of the present disclosure. It is noted that a structure spaced away from the antenna to increase the radiation area in other shape than the shapes described in FIG. 7A through FIG. 7H, may become the coupling structure according to various embodiments.

Figure 7A:
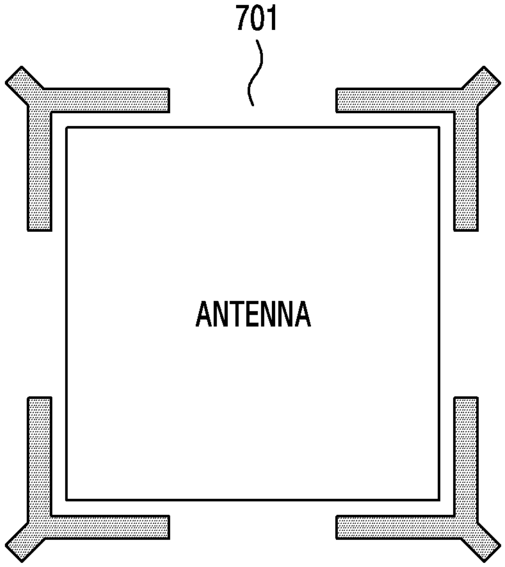
FIGS. 7A, 7B, 7C, 7D, 7E, 7F, 7G and 7H are diagrams illustrating example coupling structures according to embodiments.

Referring to FIG. 7A, a coupling structure 701 may be in a triangular start shape lengthened in three directions. The coupling structure 701 may be disposed in each corner area of a rectangular patch antenna.

Figure 7B:
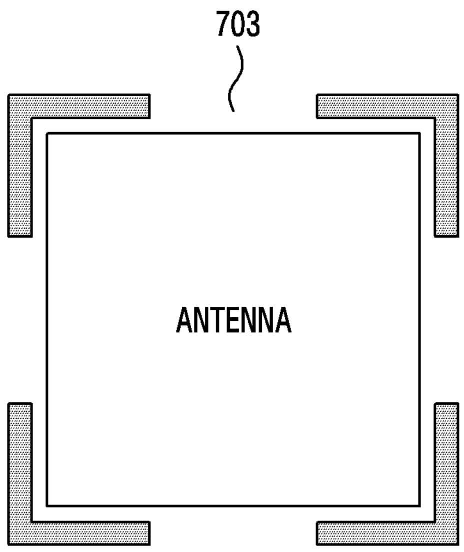

Referring to FIG. 7B, a coupling structure 703 may be in a 'L' shape. The coupling structure 703 may be disposed in each corner area of the rectangular patch antenna.

Figure 7C:
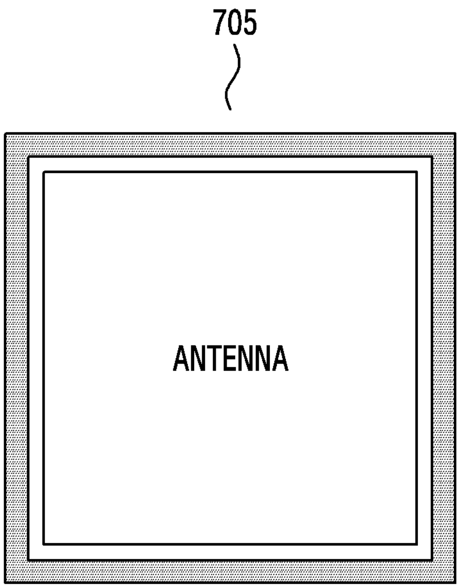

Referring to FIG. 7C, a coupling structure 705 may be in a rectangular ring shape. One coupling structure 705 may be disposed to surround the antenna. In FIG. 7C, the rectangular patch antenna is described as the example, but the present disclosure may be applied to other polygonal patch antennas. For example, for an octagonal patch antenna, a coupling structure having an octagonal ring shape may be disposed to be spaced away from the antenna. As another example, for a circular patch antenna, a coupling structure having a circular ring shape may be disposed to be spaced away from the antenna.

Figure 7D:
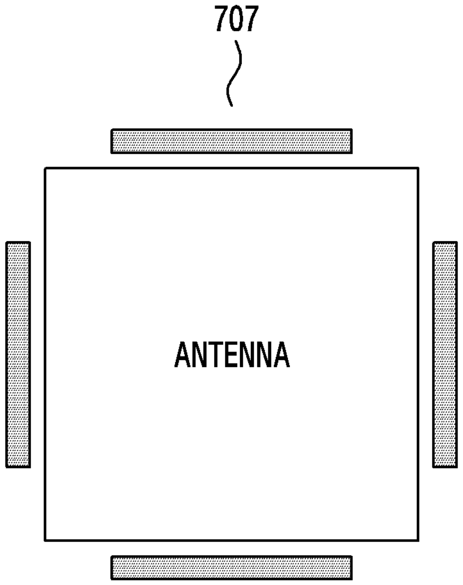

Referring to FIG. 7D, a coupling structure 707 may be in a straight shape. The coupling structure 707 may be disposed on each side of the rectangular patch antenna. The thickness of the coupling structure 707 and the length of the coupling structure 707 depend on the required coupling magnitude.

Figure 7E:
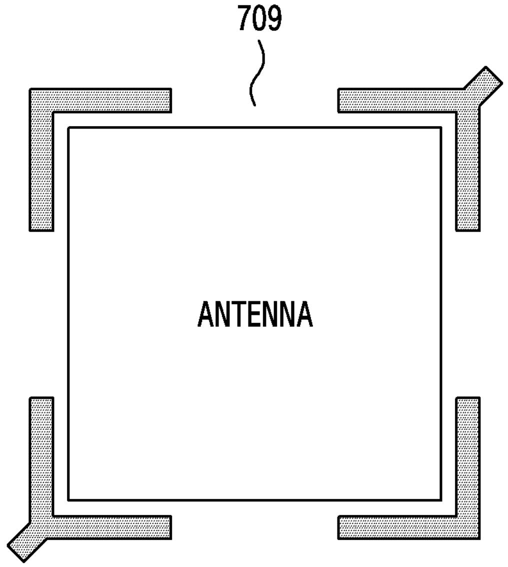

Referring to FIG. 7E, a coupling structure may have various shapes 709. For example, the coupling structure may be disposed in each corner area of the antenna. At this time, the shape of the coupling structure may differ in each corner area. According to an embodiment, the coupling structure positioned in some corner area may be in a triangular star shape (e.g., FIG. 7A). The coupling structure positioned in some other corner area may be in a 'L' shape (e.g., FIG. 7B).

Figure 7F:
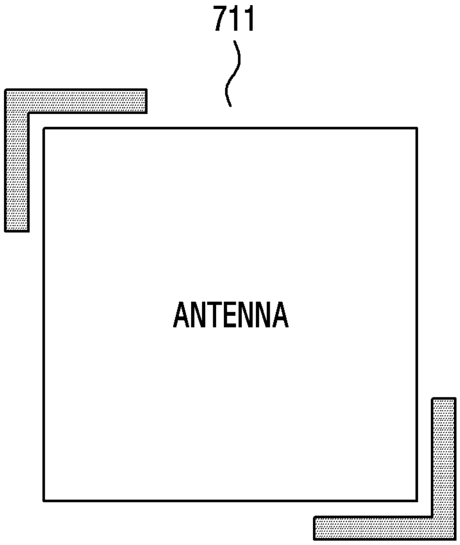

Referring to FIG. 7F, coupling structures may be positioned in some corner areas 711. Coupling structures may not be positioned in some other corner areas. Based on the coupling structure 703 shown in FIG. 7B, the coupling structures are not positioned in each corner of the antenna, but the coupling structures may be positioned only in some symmetric corner areas. While FIG. 7F illustrates that the coupling structures are positioned in the symmetric corner areas respectively, the coupling structures may be disposed asymmetrically in some embodiments.

Figure 7G:
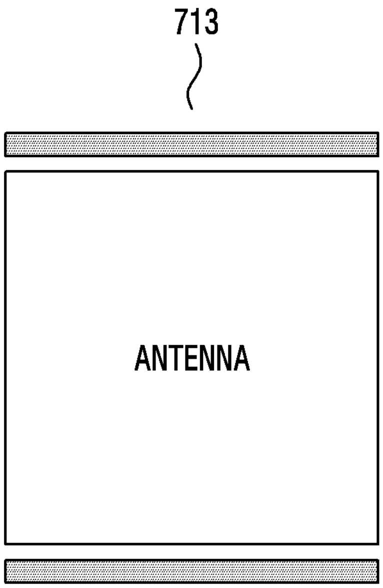

Referring to FIG. 7G, coupling structures may be positioned only in some side areas 713. Coupling structures may not be positioned in some other side areas. Based on the coupling structure 707 shown in FIG. 7D, the coupling structures are not positioned in each side area of the antenna, but the coupling structures may be positioned only in some symmetric side areas. While FIG. 7G illustrates that the coupling structures are positioned in the symmetric side areas respectively, the coupling structures may be disposed asymmetrically in some embodiments.

Figure 7H:
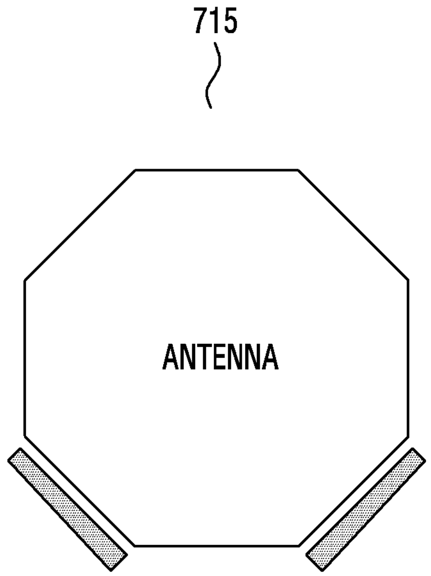

Referring to FIG. 7H, coupling structures may be positioned only in some side areas 715. In this case, the patch antenna may be an octagonal patch antenna, in a structure for increasing a cross-pol component of the polarization. The coupling structures may be disposed at asymmetric positions. The positions of the coupling structures may be associated with a position at which a signal of a first polarization is inputted and a position at which a signal of a second polarization is inputted. Coupling structures may not be positioned in some other side areas.

Figure 8A:
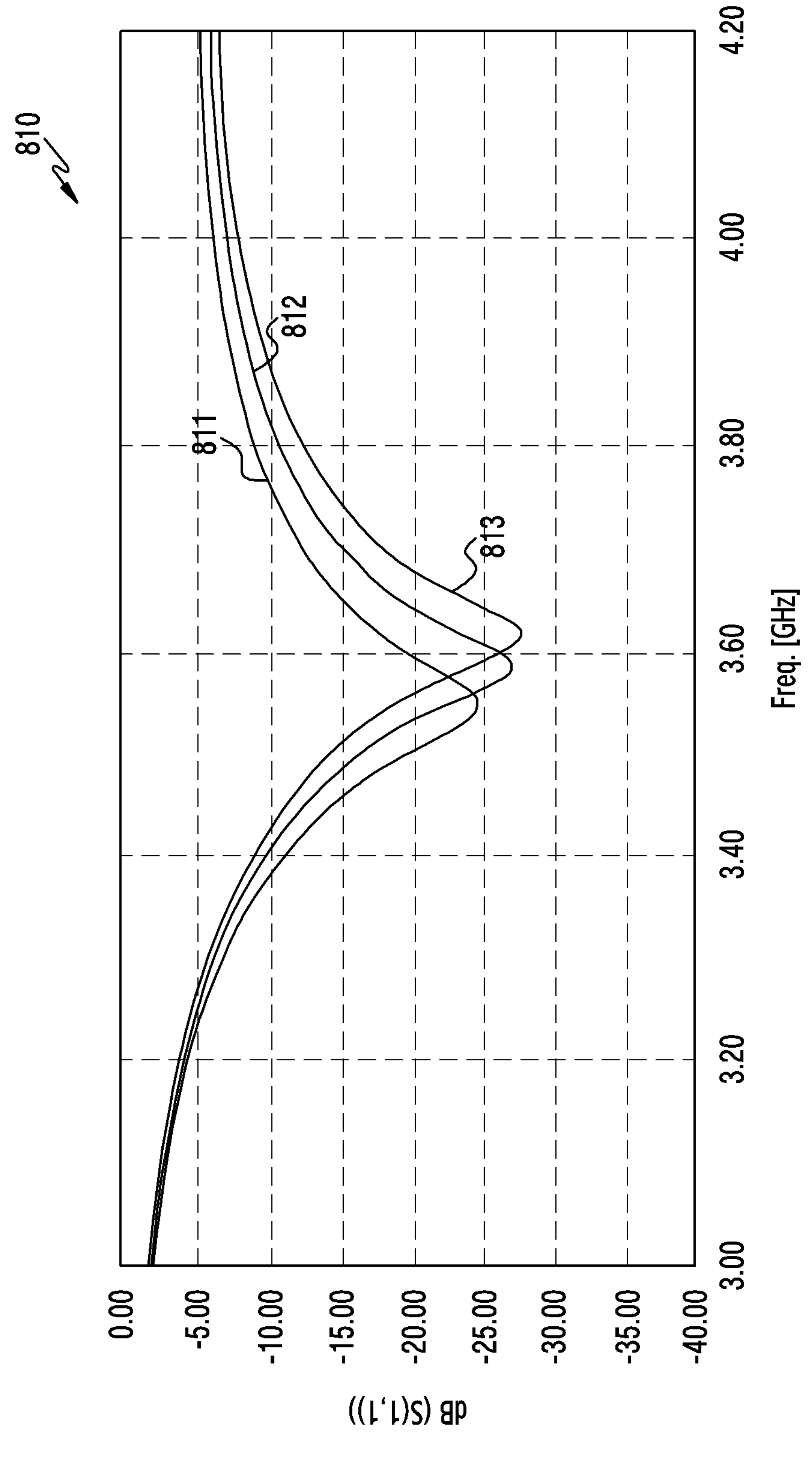
FIGS. 8A and 8B are graphs illustrating examples of antenna reflection characteristics according to a coupling structure according to embodiments.
Figure 8B:
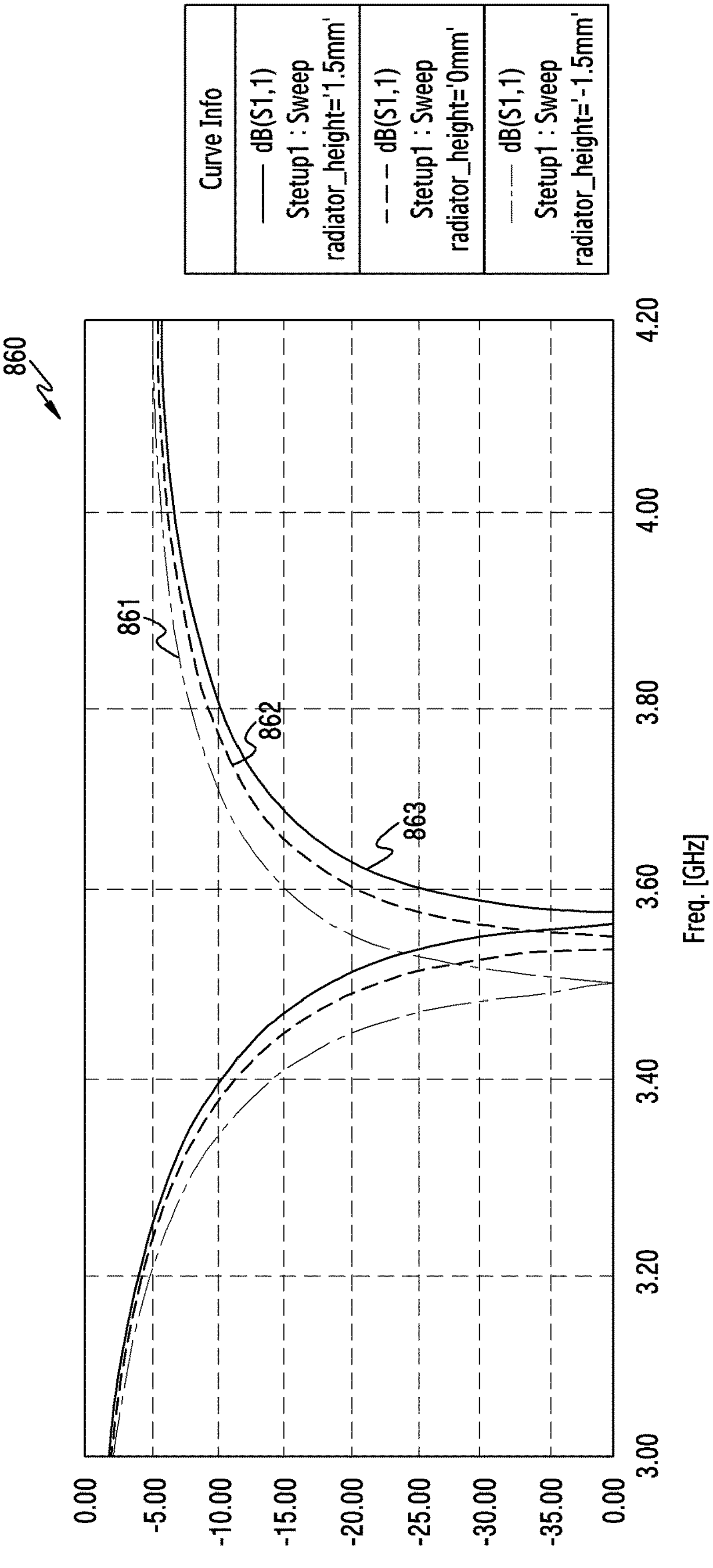

FIGS. 8A and 8B are graphs illustrating examples of antenna reflection characteristics according to a coupling structure according to embodiments. The radiation characteristics may indicate the reflection coefficient in the operating frequency.

Referring to FIG. 8A, a graph 810 shows the reflection coefficient of the antenna based on the height of the radome. The horizontal axis indicates the frequency (unit: GHz), and the vertical axis indicates the reflection coefficient S(1,1) (unit: dB). A frequency area of the lowest reflection coefficient may indicate the operating frequency. Each line 811, 812 and 813 of the graph 810 indicates from left to right the reflection characteristics according to the height increase of the radome. For example, the radome tolerance may range from −1.5 mm to 1.5 mm. The first line 811 indicates the reflection coefficient, if the radome height is the lowest tolerance −1.5 mm. The second line 812 indicates the reflection coefficient, if the radome height is the middle tolerance 0 mm. The third line 813 indicates the reflection coefficient, if the radome height is the highest tolerance 1.5 mm. As the radome height increases, it is identified that the operating frequency increases. If the radome height lowers, the distance to the antenna reduces and the effective permittivity increases. If the effective permittivity increases, the operating frequency is lowered. Conversely, if the radome height increases, the effective permittivity decreases, and thus the operating frequency increases.

Referring to FIG. 8B, a graph 860 shows the reflection coefficient of the antenna based on the height of the coupling structure. The horizontal axis indicates the frequency (unit: GHz), and the vertical axis indicates the reflection coefficient S(1,1) (unit: dB). Each line 861, 862 and 863 of the graph 860 indicates from right to left the reflection characteristics according to the height increase of the coupling structure. For example, the coupling structure may have the height range varying from −1.5 mm to 1.5 mm, according to the radome tolerance. The first line 861 indicates the reflection coefficient, at the lowest height (range: −1.5 mm). The second line 862 indicates the reflection coefficient, if the radome height is the intermediate height (range: 0 mm). The third line 863 indicates the reflection coefficient, if the radome height is the highest height (range: 1.5 mm). If the height of the coupling structure decreases, the distance between the coupling structure and the antenna increases. As the distance between the coupling structure and the antenna increases, the substantial radiation area reduces. The radiation area reduction causes the reduction of the coupling current, and accordingly the operating frequency increases. If the height of the coupling structure increases, the distance between the coupling structure and the antenna decreases. As the distance between the coupling structure and the antenna decreases, the substantial radiation area increases. The increase of the radiation area lowers the operating frequency.

Comparing the graph 810 and the graph 860, as the radome height increases, the operating frequency increases. Meanwhile, as the height of the coupling structure increases, the operating frequency is also lowered and the variation of the operating frequency may be offset. The magnitude of the reflection coefficient variation due to the radome tolerance may correspond to the magnitude of the reflection coefficient variation due to the height change of the coupling structure. Meanwhile, as shown in the graph 810 and the graph 860, a direction of the reflection coefficient variation due to the radome tolerance may be different from a direction of the reflection coefficient variation due to the height change of the coupling structure.

Figure 9A:
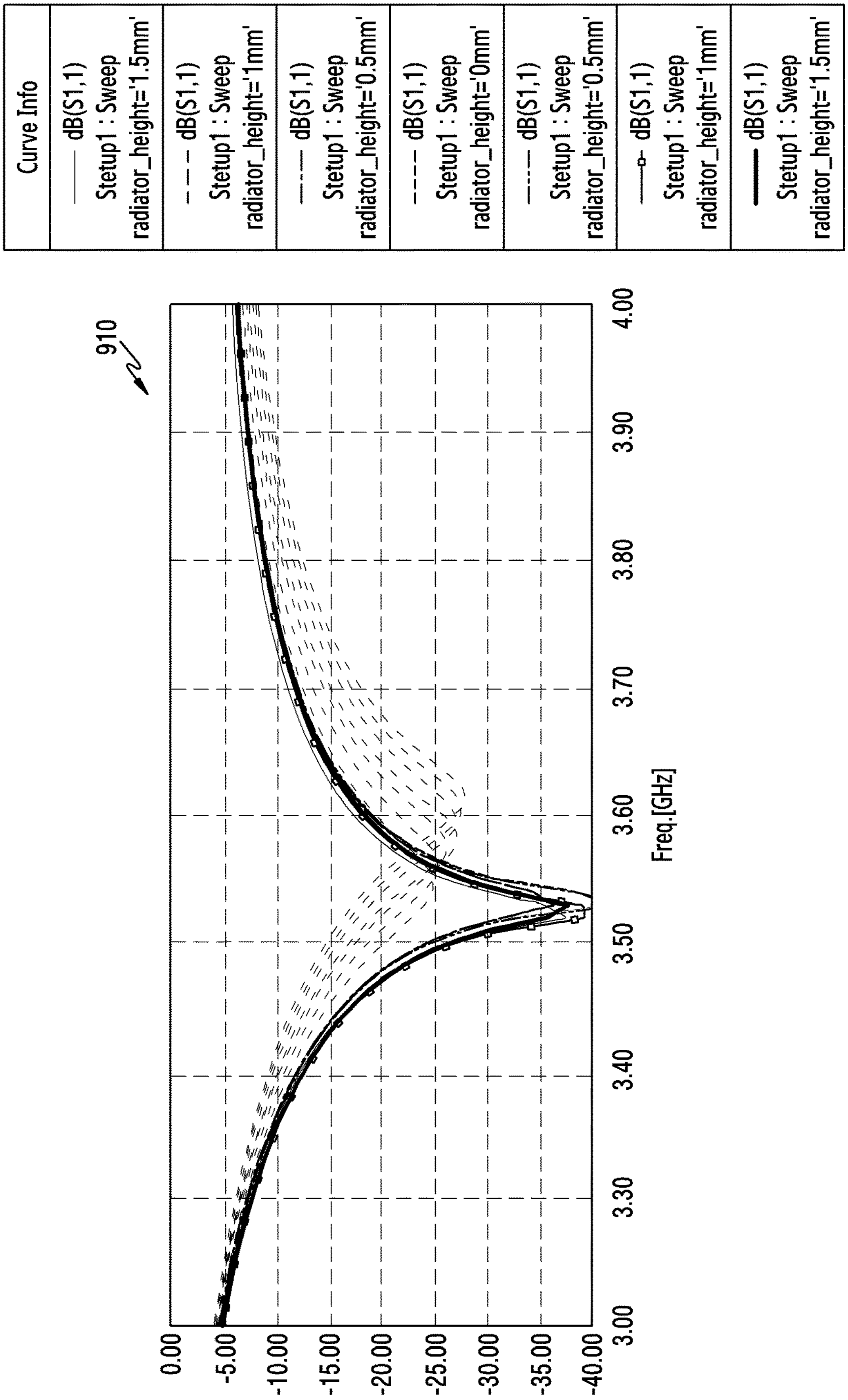
FIGS. 9A and 9B are graphs illustrating an antenna performance example according to a coupling structure according to embodiments.
Figure 9B:
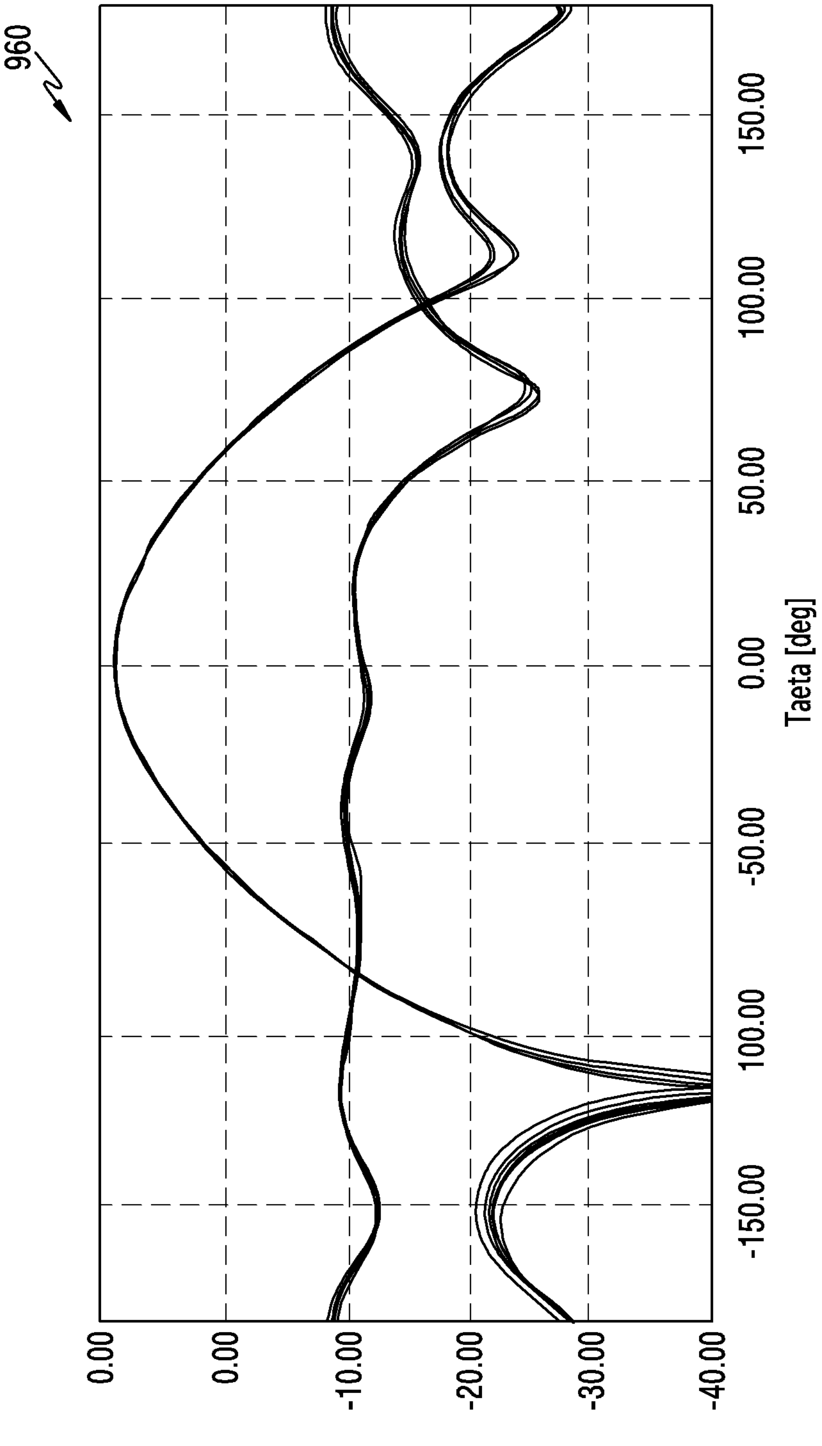

FIGS. 9A and 9B are graphs illustrating an example antenna performance according to a coupling structure according to embodiments.

Referring to FIG. 9A, a graph 910 shows the reflection coefficient of the antenna based on the height of the radome. The horizontal axis indicates the frequency (unit: GHz), and the vertical axis indicates the reflection coefficient $S_{11}$ (unit: dB). A dotted line indicates the reflection coefficient of the antenna according to a conventional radome, and a solid line indicates the reflection coefficient of the antenna with the coupling structure connected to the radome. A frequency area of the lowest reflection coefficient may indicate the operating frequency. Each line of the graph 910 indicates the height of the different radome. The radome height is associated with the height of the coupling structure. According to an embodiment, the height range (e.g., −1.5 mm~+1.5 mm) of the coupling structure corresponds to the tolerance (e.g., −1.5 mm~+1.5 mm) of the radome height. Hence, antenna return loss characteristics may be constantly maintained regardless of the radome tolerance.

Referring to FIG. 9B, a graph 960 shows the radiation characteristics of the antenna based on the radome height. The horizontal axis indicates an angel (unit: degrees), and the vertical axis indicates a gain (unit: dB). Each line indicates the height of the different radome. Even if the radome height varies, it is identified that the radiation characteristics do not change.

The embodiments of the present disclosure suggest a deployment structure and an antenna radome for supplementing performance degradation by a radome tolerance. A specific structure is used to adjust the performance change by the radome tolerance. The specific structure may be configured to maintain the antenna characteristics even under the radome tolerance, through the coupling with antenna radiator. The radome structure including the specific structure may prevent and/or reduce the antenna performance degradation resulting from the radome height tolerance.

Meanwhile, FIG. 1 through FIG. 9B illustrate the relations of the radome which is the antenna cover, the antenna element, and the antenna board. By connecting the coupling structure to the radome, the structure for addressing the radome tolerance may be equally applied to an antenna array in which a plurality of antenna elements is compact as well as the single antenna. For example, it is noted that the explanations shown in FIG. 1 through FIG. 9B are applicable to not only the electronic device including the single antenna but also the electronic device including a plurality of antennas.

To increase the signal gain, the beamforming technology or the subarray technology may be used. According to an embodiment, the radome is not disposed for the one antenna element alone but may be disposed to protect the plurality of the antenna elements. To control one radome tolerance, the coupling structure corresponding to each antenna element may be connected to the radome. According to an embodiment, the radome may be physically connected with a plurality of coupling structures. One or more coupling structures for controlling the coupling connection of one antenna element may be defined as one coupling structure set. The radome may be connected with the plurality of the coupling structures. The height change according to the radome tolerance affects the height change of the coupling structure sets adjacent to the antenna elements which cover the radome. As described in FIG. 5A through FIG. 9B, the coupling structure sets may be disposed to suppress the variation of the operating frequency due to the radome tolerance through the coupling with the antenna.

Figure 10:
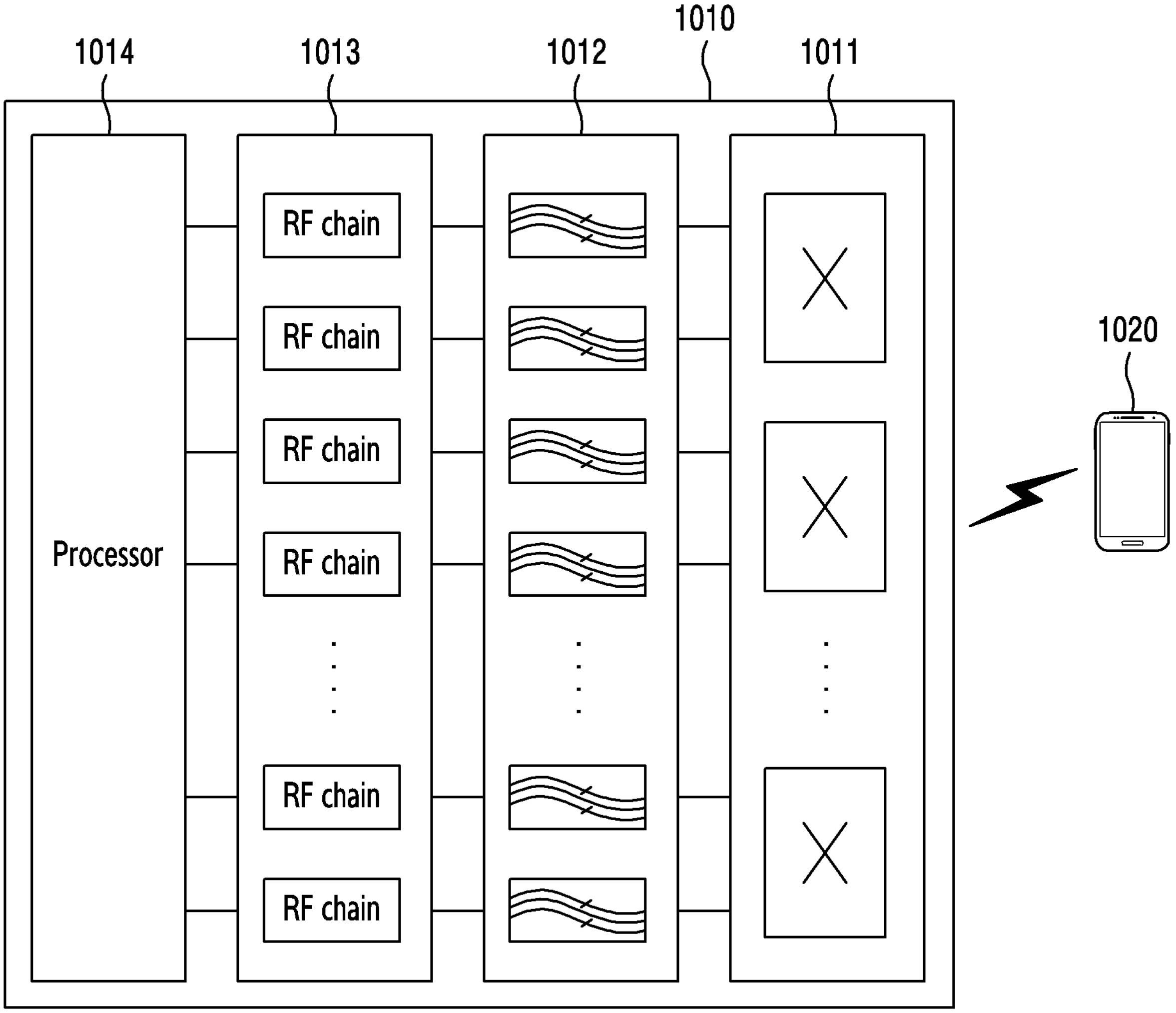
FIG. 10 is a diagram illustrating an example functional configuration of an electronic device including a radome with a coupling structure formed according to embodiments.

FIG. 10 is a diagram illustrating an example functional configuration of an electronic device including a radome with a coupling structure formed according to embodiments. An electronic device 110 may, for example, and without limitation, be one of the base station 110 or the terminal 120 of FIG. 1. According to an embodiment, the electronic device 110 may be an MMU. According to an embodiment, the electronic device 110 may be base station equipment including an mmWave communication module. Not only the coupling structure deployment of the radome illustrated with reference to FIG. 1 through FIG. 9B but also the electronic device including the same are included in the embodiments of the present disclosure.

Referring to FIG. 10, the example functional configuration of the electronic device 110 is shown. The electronic device 110 may include an antenna unit (e.g., including an antenna) 1011, a filter unit (e.g., including a filter) 1012, a radio frequency (RF) processing unit (e.g., including RF circuitry) 1013, and a control unit or processor (e.g., including processing circuitry) 1014.

The antenna unit 1011 may include a plurality of antennas. The antenna performs functions for transmitting and receiving signals over a radio channel. The antenna may include a radiator disposed on a side surface of a substrate (e.g., a PCB). The antenna may radiate an unconverted signal or obtain a signal radiated by other device over the radio channel. Each antenna may be referred to as an antenna element or an antenna device. In some embodiments, the antenna unit 1011 may include an antenna array in which a plurality of antenna elements is arrayed. According to an embodiment, the subarray technology may be used. The antenna array may include a plurality of subarrays. One subarray may include a plurality of antenna elements. For example, the subarray may include two antenna elements. Also, for example, the subarray may include three antenna elements. In addition, for example, the subarray may include six antenna elements. The antenna unit 1011 may be electrically connected with the filter unit 1012 through RF signal lines.

According to an embodiment, the antenna unit 1011 may include at least one antenna module having a dual polarization antenna. The dual polarization antenna may be, for example, a cross-pole (x-pol) antenna. The dual polarization antenna may include two antenna elements corresponding to different polarizations. For example, the dual polarization antenna may include a first antenna element having the polarization of +45° and a second antenna element having the polarization of −45°. It is noted that the polarizations may be formed with other orthogonal polarizations than +45° and −45°. Each antenna element may be connected with a feeding line, and may be electrically connected with the filter unit 1012, the RF processing unit 1013, and the control unit 1014 to be described.

According to an embodiment, the dual polarization antenna may be a patch antenna (or a microstrip antenna). The dual polarization antenna, which has the patch antenna form, may be easily implemented and integrated as the array antenna. Two signals having different polarizations may be inputted to respective antenna ports. Each antenna port corresponds to the antenna element. For high efficiency, it is required to optimize relationship of co-pol characteristics and cross-pol characteristics between the two signals having the different polarizations. In the dual polarization antenna, the co-pol characteristics indicate characteristics of a specific polarization component and the cross-pol characteristics indicate characteristics of other polarization component than the specific polarization component.

According to an embodiment, an antenna radome for protecting the antenna unit 1011 may be mounted on an electronic device 1010. The antenna radome may be disposed to structurally protect the plurality of the antennas and the antenna board. One surface of the antenna radome may be substantially parallel to the antennas. As a spacing between the antenna radome and the antenna element of the antenna unit 1011 reduces, the reflection characteristics due to the antenna radome tolerance may not be stable. The antenna radome according to embodiments of the present disclosure may include the coupling structure for coupling connecting with each antenna element, to provide the stable reflection characteristics. The coupling structure may be physically connected with the antenna radome, to move together in response to the height change according to the tolerance of the antenna radome.

The filter unit 1012 may include at least one filter and perform filtering, to forward the signal of an intended frequency. The filter unit 1012 may perform a function for selectively identifying the frequency by generating the resonance. In some embodiment, the filter unit 1012 may generate the resonance through a cavity structurally including a dielectric. Also, the filter unit 1012 may generate the resonance through elements which generate inductance or capacitance in some embodiments. In addition, in some embodiment, the filter unit 1012 may include an elastic filter such as a bulk acoustic wave (BAW) filter or a surface acoustic wave (SAW) filter. The filter unit 1012 may include at least one of a band pass filter, a low pass filter, a high pass filter, or a band reject filter. That is, the filter unit 1012 may include RF circuits for acquiring the signal of the frequency band for transmission or the frequency band for reception. The filter unit 1012 according to various embodiments may electrically connect the antenna unit 1011 and the RF processing unit 1013.

The RF processing unit 1013 may include various RF circuitry including a plurality of RF paths. The RF path may be a unit of a path through which the signal received via the antenna or the signal radiated via the antenna passes. At least one RF path may be referred to as an RF chain. The RF chain may include a plurality of RF elements. The RF elements may include an amplifier, a mixer, an oscillator, a DAC, an ADC, or the like. For example, the RF processing unit 1013 may include an up converter which upconverts a digital transmit signal of a base band into a transmission frequency, and a DAC which converts the upconverted digital transmit signal into an analog RF transmit signal. The up converter and the DAC form a part of the transmission path. The transmission path may further include a power amplifier (PA) or a coupler (or a combiner). In addition, for example, the RF processing unit 1013 may include an ADC which converts an analog RF receive signal into a digital receive signal, and a down converter which converts the digital receive signal into the digital receive signal of the base band. The ADC and the down converter form a part of the reception path. The reception path may further include a low-noise amplifier (LNA) or a coupler (or a divider). RF parts of the RF processing unit may be implemented on a PCB. The electronic device 110 may include a structure in which the antenna unit 1011-the filter unit 1012-the RF processing unit 1013 are stacked in order. The antennas and the RF parts of the RF processing unit may be implemented on a PCB, and filters may be repeatedly coupled between the PCB and the PCB to form a plurality of layers.

The control unit or processor 1014 may include various processing circuitry and control general operations of the electronic device 110. The control unit 1014 may include various modules for performing the communication. The control unit 1014 may include at least one processor such as a modem. The control unit 1014 may include modules for digital signal processing. For example, the control unit 1014 may include a modem. In data transmission, the control unit 1014 generates complex symbols by encoding and modulating a transmit bit string. In addition, for example, in data reception, the control unit 1014 may restore a receive bit string by demodulating and decoding a base band signal. The control unit 1014 may perform functions of a protocol stack required by the communication standard.

FIG. 10 has described the functional configuration of the electronic device 110, as the equipment for utilizing the deployment of the coupling structure of the radome of the present disclosure. However, the example illustrated in FIG. 10 is simply an example configuration for utilizing the antenna module according to embodiments of the present disclosure described in FIG. 1 through FIG. 9B, and the embodiments of the present disclosure are not limited to the configuration elements of the equipment shown in FIG. 10. Hence, communication equipment of another configuration also may be understood as an embodiment of the present disclosure.

According to example embodiments of the present disclosure, an electronic device may include: a printed circuit board (PCB); an antenna; a radome; and a coupling structure, the antenna may be disposed to be positioned at a first height from a first surface of the PCB, the coupling structure may be physically connected with the radome, and the coupling structure may be disposed to have a second height lower than or equal to the first height, from the first surface of the PCB.

According to an example embodiment, a radiation surface of the antenna may be positioned between the coupling structure and the radome, with respect to the first surface of the PCB.

According to an example embodiment, the coupling structure may be coupling connected with the antenna.

According to an example embodiment, a height range of the coupling structure may correspond a tolerance range of the radome.

According to an example embodiment, a thickness of the coupling structure may be based on a distance between the radome and the antenna, based on a radiation surface of the antenna.

According to an example embodiment, a length of the coupling structure may be based on a distance between the radome and the antenna, based on a radiation surface of the antenna.

According to an example embodiment, a distance between the coupling structure and the antenna may be based on a distance between the radome and the antenna, based on a radiation surface of the antenna.

According to an example embodiment, the coupling structure may include a first area formed away from one side of a radiation surface of the antenna from a center point and a second area formed away from the other side of the radiation surface of the antenna from the center point.

According to an example embodiment, the coupling structure may further include a third area formed away from the radiation surface of the antenna from the center point.

According to an example embodiment, the antenna may be a patch antenna including a radiation surface.

According to example embodiments of the present disclosure, an electronic device may include: a printed circuit board (PCB); a plurality of antennas; a radome; and a plurality of coupling structure sets, the plurality of the coupling structure sets may be physically connected with the radome, and each set of the plurality of the coupling structure sets may be disposed to have a height lower than or equal to a height of a corresponding antenna among the plurality of the antennas, from a first surface of the PCB.

According to an example embodiment, each radiation surface of the plurality of the antennas may be positioned between a corresponding coupling structure set among the plurality of the coupling structure sets and the radome, based on the first surface of the PCB.

According to an example embodiment, each set of the plurality of the coupling structure sets may be coupling connected with a corresponding antenna among the plurality of the antennas.

According to an example embodiment, a height of each coupling structure of the plurality of the coupling structure sets may correspond to a tolerance range of the radome.

According to an example embodiment, a thickness of a coupling structure of a coupling structure set corresponding to the antenna may be based on a distance between the radome and the antenna, based on a radiation surface of the antenna among the plurality of the antennas.

According to an example embodiment, a length of a coupling structure of a coupling structure set corresponding to the antenna may be based on a distance between the radome and the antenna, based on a radiation surface of the antenna among the plurality of the antennas.

According to an example embodiment, a distance between a coupling structure of a coupling structure set corresponding to the antenna and the antenna may be based on a distance between the radome and the antenna, based on a radiation surface of the antenna among the plurality of the antennas.

According to an example embodiment, the plurality of the coupling structure sets may include a first area formed away from one side of a radiation surface of the antenna from a center point and a second area formed away from the other side of the radiation surface of the antenna from the center point.

According to an example embodiment, the coupling structure may further include a third area formed away from the radiation surface of the antenna from the center point.

According to an example embodiment, the plurality of the antennas each may be a patch antenna including a radiation surface.

The methods according to the embodiments described in the claims or the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the various example embodiments of the present disclosure, the elements included in the present disclosure are expressed in a singular or plural form. However, the singular or plural expression is appropriately selected according to a disclosed situation for the convenience of explanation, the present disclosure is not limited to a single element or a plurality of elements, the elements expressed in the plural form may be configured as a single element, and the elements expressed in the singular form may be configured as a plurality of elements.

While the disclosure has been illustrated and described with reference to various example embodiments it will be understood that the various example embodiments are intended to be illustrative, not limiting. It will be further understood by those skilled in the art that various changes may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An antenna module comprising:

a printed circuit board (PCB);

an antenna including at least a first corner and a second corner opposite to the first corner;

a dielectric configured for covering at least the antenna; and a plurality of coupling structures connected with the dielectric, wherein the plurality of coupling structures includes a first coupling structure adjacent to the first corner and a second coupling structure adjacent to the second corner configured for adjusting a frequency of signals radiated by the antenna, wherein the antenna is disposed at a first height from a first surface of the PCB, and wherein the plurality of coupling structures are disposed at a second height lower than or equal to the first height, from the first surface of the PCB.

2. The antenna module of claim 1, wherein a radiation surface of the antenna is positioned between the plurality of coupling structures and the dielectric, and wherein the first coupling structure and the second coupling structure are electrically connected with the antenna via a coupling.

3. The antenna module of claim 1, wherein a height range of the plurality of coupling structures corresponds to a tolerance range of the dielectric.

4. The antenna module of claim 1, wherein a thickness of the plurality of coupling structures is based on a distance between the dielectric and a radiation surface of the antenna.

5. The antenna module of claim 1, wherein a length of the plurality of coupling structures is based on a distance between the dielectric and a radiation surface of the antenna.

6. The antenna module of claim 1, wherein a distance between the plurality of coupling structures and the antenna is based on a distance between the dielectric and a radiation surface of the antenna.

7. The antenna module of claim 1, wherein the antenna comprises a patch antenna comprising a radiation surface, and wherein the plurality of the coupling structures are configured for tuning the frequency.

8. The antenna module of claim 1, wherein the antenna includes a third corner and a fourth corner opposite to the third corner, and wherein the plurality of coupling structures further includes a third coupling structure adjacent to the third corner and a fourth coupling structure adjacent to the fourth corner.

9. The antenna module of claim 8, wherein the third coupling structure and the fourth coupling structure are electrically connected with the antenna via a coupling, and wherein the third coupling structure and the fourth coupling structure are symmetrical with respect to a center of the antenna.

10. The antenna module of claim 1, wherein the first coupling structure and the second coupling structure are symmetrical with respect to a center of the antenna.

11. An electronic device comprising:

a printed circuit board (PCB);

a plurality of antennas including an antenna including at least a first corner and a second corner opposite to the first corner;

a dielectric configured for covering at least the plurality of antennas including the antenna; and a plurality of coupling structure sets including a plurality of coupling structures corresponding to the antenna, wherein the plurality of coupling structures are connected with the dielectric, wherein the plurality of coupling structures include a first coupling structure adjacent to the first corner and a second coupling structure adjacent to the second corner for adjusting a frequency of signals radiated by the antenna, wherein the antenna is disposed at a first height from a first surface of the PCB, and wherein the plurality of coupling structures are disposed at a second height lower than or equal to the first height, from the first surface of the PCB.

12. The electronic device of claim 11, wherein a radiation surface of the antenna is positioned between the plurality of coupling structures and the dielectric, and wherein the first coupling structure and the second coupling structure are electrically connected with the antenna via a coupling.

13. The electronic device of claim 11, wherein a height range of the plurality of coupling structures corresponds to a tolerance range of the dielectric.

14. The electronic device of claim 11, wherein a thickness of the plurality of coupling structures is based on a distance between the dielectric and a radiation surface of the antenna.

15. The electronic device of claim 11, wherein a length of the plurality of coupling structures is based on a distance between the dielectric and a radiation surface of the antenna.

16. The electronic device of claim 11, wherein a distance between the plurality of coupling structures and the antenna is based on a distance between the dielectric and a radiation surface of the antenna.

17. The electronic device of claim 11, wherein each of the plurality of the antennas comprises a patch antenna comprising a radiation surface.

18. The electronic device of claim 11, wherein the antenna includes a third corner and a fourth corner opposite to the third corner, and wherein the plurality of coupling structures further includes a third coupling structure adjacent to the third corner and a fourth coupling structure adjacent to the fourth corner.

19. The electronic device of claim 18, wherein the third coupling structure and the fourth coupling structure are electrically connected with the antenna via a coupling, and wherein the third coupling structure and the fourth coupling structure are symmetrical with respect to a center of the antenna.

20. The electronic device of claim 11, wherein the first coupling structure and the second coupling structure are symmetrical with respect to a center of the antenna.

* * * * *